United States Patent
Kremer

(10) Patent No.: US 7,404,292 B2
(45) Date of Patent: Jul. 29, 2008

(54) HYDRAULIC SYSTEM, IN PARTICULAR FOR MOTOR VEHICLES

(75) Inventor: Eugen Kremer, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 204 days.

(21) Appl. No.: 11/223,722

(22) Filed: Sep. 9, 2005

(65) Prior Publication Data

US 2006/0054443 A1     Mar. 16, 2006

(30) Foreign Application Priority Data

Sep. 11, 2004    (DE) .................... 10 2004 043 958

(51) Int. Cl.
*F15B 7/00* (2006.01)
(52) U.S. Cl. .......................... 60/545; 60/591
(58) Field of Classification Search .............. 60/545, 60/591, 592
See application file for complete search history.

(56) References Cited

U.S. PATENT DOCUMENTS

| 4,241,584 A | * | 12/1980 | Jaecks | ............ | 60/591 |
|---|---|---|---|---|---|
| 4,478,237 A | | 10/1984 | Blake et al. | | |
| 4,976,190 A | * | 12/1990 | Cooney | ............ | 60/591 |
| 5,337,564 A | | 8/1994 | Bakke et al. | | |
| 6,616,577 B2 | | 9/2003 | Hayashi | | |

FOREIGN PATENT DOCUMENTS

| DE | 691 03 628 T2 | 4/1995 |
|---|---|---|
| DE | 601 02 322 T2 | 3/2005 |
| EP | 0 412 711 | 2/1991 |
| EP | 0 527 862 B1 | 2/1993 |
| EP | 1 167 111 B1 | 1/2002 |
| WO | WO 84/00794 | 3/1984 |

* cited by examiner

*Primary Examiner*—F. Daniel Lopez
(74) *Attorney, Agent, or Firm*—Davidson, Davidson & Kappel

(57) ABSTRACT

In a hydraulic system for motor vehicles in particular, including a master cylinder, a slave cylinder, and a pressure medium line connecting them, an inexpensive pressure boost is achieved by the fact that the hydraulic system includes a pump having an inlet and an outlet and a valve which are situated between the master cylinder and the slave cylinder in the pressure medium line. The valve has a first valve position in which the master cylinder and the slave cylinder are directly interconnected and a second valve position in which the master cylinder and the slave cylinder are interconnected via a pump.

16 Claims, 5 Drawing Sheets

HYDRAULIC SYSTEM, IN PARTICULAR FOR MOTOR VEHICLES

This claims benefit of German Patent Application No. 10 2004 043 958.3, which is hereby incorporated by reference herein.

BACKGROUND

The present invention relates to a hydraulic system, in particular for motor vehicles, including a master cylinder, a slave cylinder, and a pressure medium line connecting these two, as well as a hydraulic valve, in particular for use in a hydraulic system for motor vehicles.

It is known that a servo-supported hydraulic system may be used for clutch operation to reduce the pedal force exerted by the driver of a motor vehicle. For example, an electric pump in the hydraulic system increases the pressure between the master cylinder and the slave cylinder. The pump may be electronically regulated, for example. To do so, at least one pressure sensor is required in the hydraulic system because the pump pressure is pressure dependent. One disadvantage of such systems is that the cost is relatively high (e.g., due to the pressure sensor and the electronic regulation), the hysteresis of the clutch characteristic is reproduced and sometimes even increased in the pedal force curve, in particular at high pedal speeds, and there may be additional pulsation of the pedal.

European Patent Application No. 00 412 711 (DE 690 09 345) describes a hydraulic system for a continuously variable transmission (CVT) in which multiple control valves are provided in the regulating circuits for the transmission adjustment and clutch control. The control valves are each triggered by their own electronically regulated hydraulic control circuits.

SUMMARY OF THE INVENTION

An object of the present invention is to provide a hydraulic system which will eliminate the aforementioned disadvantages. In particular electronic regulation of the servo support during pedal operation may be omitted.

The present invention provides a hydraulic system, in particular for motor vehicles, including a master cylinder, a slave cylinder, and a pressure medium line connecting the two, wherein the hydraulic system includes a pump having an inlet, an outlet, and a valve which are situated in the pressure medium line between the master cylinder and the slave cylinder, the valve having a first valve position in which the master cylinder and the slave cylinder are connected to one another and a second valve position in which the master cylinder and the slave cylinder are connected via the pump. The valve preferably has a third valve position in which the master cylinder and the slave cylinder are connected via the pump, the outlet and the inlet of the pump being connected via a bypass. The volume flow through the bypass is preferably regulable by the valve with the valve position of the valve preferably being a function of the pressure prevailing in the hydraulic system. The valve may switch the hydraulic connection between the master cylinder and the slave cylinder from a direct connection to a connection via the pump, there being a transitional position between the two end positions in which the pump is only partially active due to a bypass short-circuiting the inlet and outlet of the pump. In this third valve position, the pump thus may be activated gradually, i.e., depending on the pressure and the hydraulic system, and thus indirectly depending on the clutch pedal path. The pump at first has no effect, idling so to speak through the fully active bypass. With a further increase in pressure, the bypass is gradually closed; when the bypass is completely closed, the pressure increase between the master cylinder and slave cylinder due to the pump is at its maximum. With the bypass completely open, i.e., with the clutch engaged, the pump may also be turned off. A limit switch connected to the clutch pedal, for example, is the (only) electric control means, which is understood here not as electronic regulation as defined in the statement of the object of the present invention.

In a refinement of the hydraulic system, the valve includes at least one connection on the master cylinder end and one connection on the slave cylinder end as well as a piston which is axially displaceable in a housing, the piston having an end face which is hydraulically linked to the connection on the master cylinder end, and a back face opposite the end face, a spring being situated on the back face, exerting a force on the piston in the direction of the end face, both the piston and the housing having connecting channels which form the valves which open and close with the axial displacement of the piston. The connecting channels may be of any type, e.g., bores, recesses and the like, but they are preferably ring grooves on the outside surface of the piston and the inside surface of the housing. The piston is preferably a turned part having essentially circular cross sections as the outside surface; the bore to receive the piston is shaped accordingly.

In a refinement of the hydraulic system, it includes a first valve which is formed by an inlet ring groove of the housing and a piston ring groove of the piston. In addition, it preferably includes a second valve which is formed by an outlet ring groove of the housing and a piston ring groove of the piston and also preferably a third valve which is formed by an inlet ring groove of the housing and the piston ring groove of the piston. These ring grooves run preferably concentrically around the piston, with the different names being used merely to facilitate identification.

In a refinement of the hydraulic system, in a starting position of the piston, the first valve is open, the second is closed and the third valve is open. When the piston moves axially, the first valve closes first; when it moves further, the second valve opens and when it moves further, the third valve closes. In addition, it may be provided that during an axial movement of the piston in which the first valve closes, the second valve opens and the third valve is open. In addition, it may be provided that during an axial movement of the piston in which the third valve closes, the second valve is open and the first valve is closed.

In a refinement of the hydraulic system, the piston has on its back face a piston face which together with a stepped bore forms a piston/cylinder system which exerts a force on the piston in the direction of the spring force when pressure acts upon it. This forms a type of "counterpiston" to the end face and reduces the effect of its force. Likewise the stepped bore may be hydraulically connected to the connection on the slave cylinder end. This yields on the whole a closed system with the piston operating, for example, against atmospheric pressure; a complex gasket or an oil leakage drain, e.g., to the equalizing container of the hydraulic system, would have to be provided.

To limit both the pressure level of the ring piston in particular and the volume flow with the pump running in idling, it is possible to provide for a throttle valve to be situated upstream from the inlet to the pump. The inlet to the pump is connected to a ring piston space formed by the journal and the outside circumference of the piston.

The present invention also provides a hydraulic valve for use in a hydraulic system for motor vehicles in which at least one feature or a combination of features of the preceding description directed at a hydraulic valve is implemented.

BRIEF DESCRIPTION OF THE DRAWINGS

Exemplary embodiments of the present invention are explained below on the basis of the accompanying drawings.

DETAILED DESCRIPTION

Figure 1:
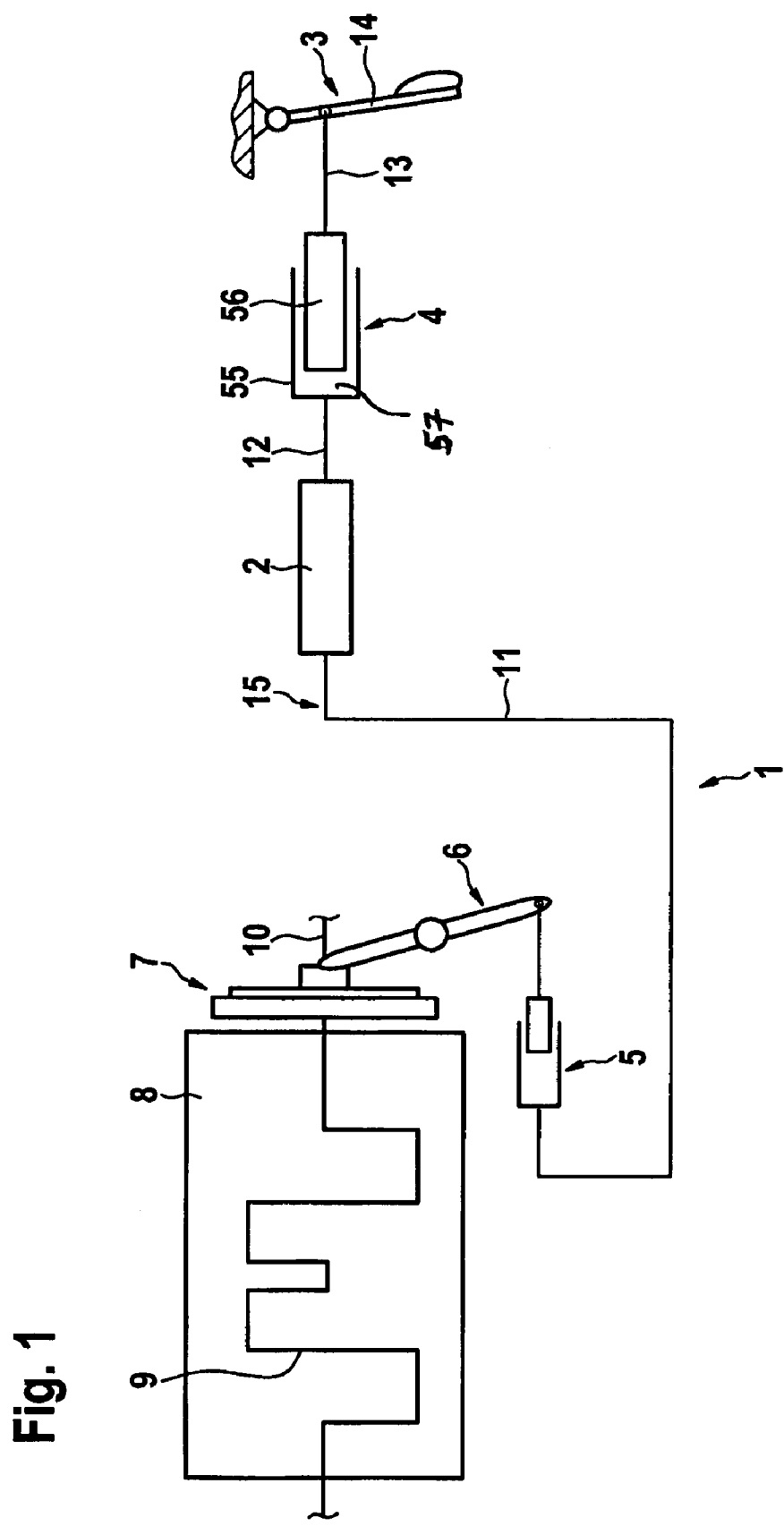
FIG. 1 shows a schematic diagram of a hydraulic system on the basis of an exemplary embodiment of a clutch release device.

FIG. 1 shows a schematic diagram of a possible embodiment of a hydraulic system on the basis of a clutch release device 3 having a master cylinder 4 and a slave cylinder 5. The master cylinder includes a housing 55 and a piston 56, which is axially movable in the housing and borders a pressure chamber 57 filled with hydraulic fluid; on operation of master cylinder 4, piston 56 is axially moved by a piston rod 13 acting on the piston, thereby applying pressure to the hydraulic fluid. The functioning of slave cylinder 5 is identical in principle. A valve block 2 is installed in a pressure medium line 15 connecting the master cylinder 4 and the slave cylinder 5 in the exemplary embodiment shown here and dividing this pressure medium line into a first line segment 11 and a second line segment 12. It is self-evident that in other exemplary embodiments, valve block 2 may be situated on master cylinder 4 or on slave cylinder 5. In addition, the function of a vibration filter may also be integrated into valve block 2 at the same time, e.g., as an anti-vibration unit.

Clutch release system 3 operates clutch 7 hydraulically by acting upon master cylinder 4 via a clutch pedal 14 which may be a foot pedal, an actuator, e.g., an electric actuator, or the like. Pressure is therefore built up in master cylinder 4 via a mechanical transmission 13, building up a pressure in slave cylinder 5 via pressure medium line 15, i.e. second line segment 12, valve block 2, and first line segment 11. Slave cylinder 5 may be concentric with transmission input shaft 10 and supported axially on a transmission housing, applying the required clutch release force via a clutch release bearing on clutch 7, e.g., on its release elements such as disk springs. To facilitate an understanding of how this functions, FIG. 1 shows a slave cylinder 5 which operates a disengaging device via a clutch release mechanism 6 and is situated outside of the transmission bell housing, this disengaging device acting upon the clutch release mechanism via a piston situated in the slave cylinder housing and hydraulically connected to the master cylinder. To apply the disengagement force, the slave cylinder is fixedly mounted on the transmission housing or on some other part mounted on the housing. When clutch 7 is engaged, transmission input shaft 10 transmits the torque of internal combustion engine 8 to a transmission and then to the drive wheels of a motor vehicle.

Figure 2:
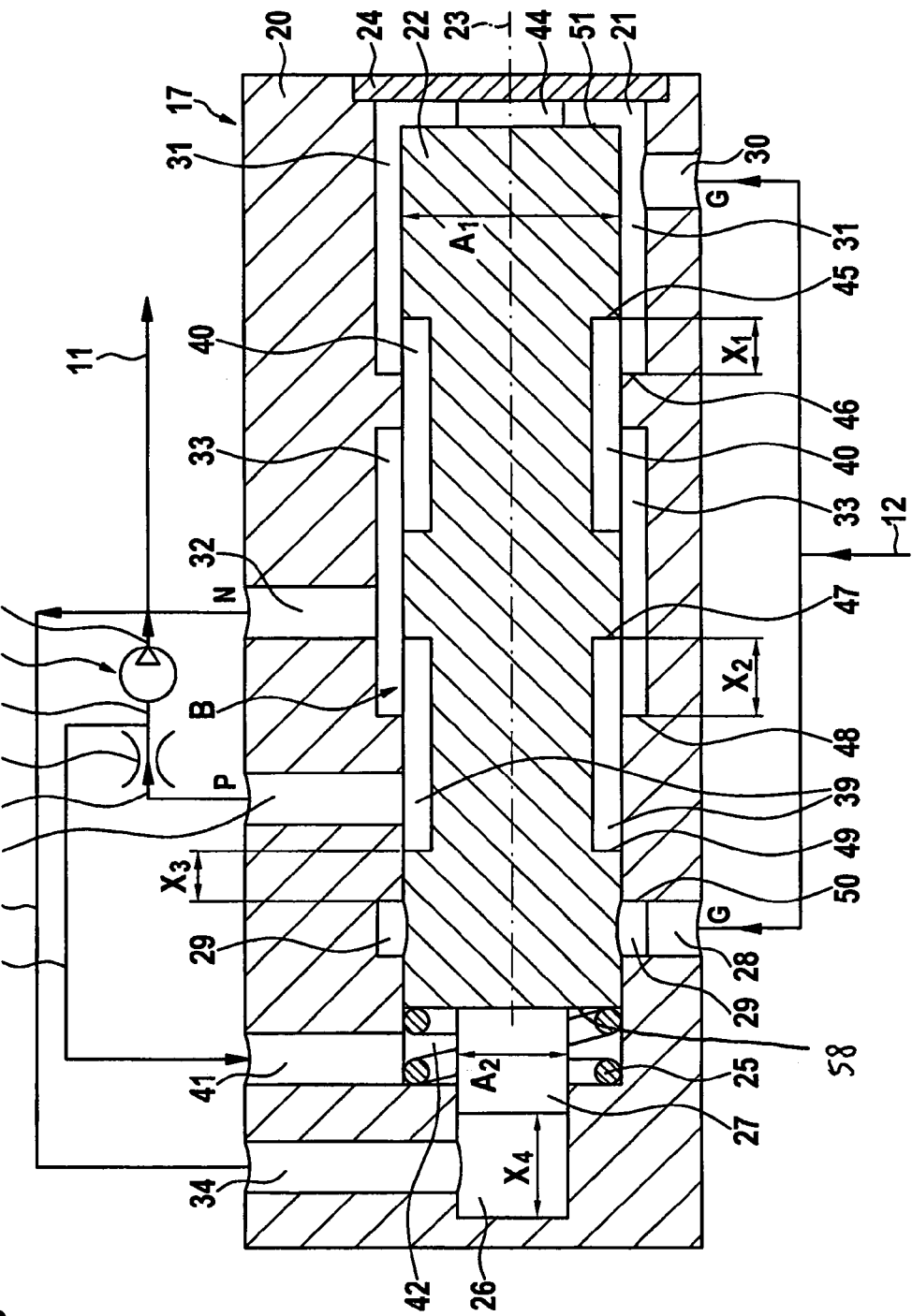
FIG. 2 shows a sectional diagram of a valve according to the present invention.

FIG. 2 shows a diagram of valve block 2 in a sectional drawing. Valve block 2 includes a pump 16, driven by an electric motor, for example, and a valve 17. As shown in FIG. 1, valve block 2 is situated between the master cylinder 4 and the slave cylinder 5 in pressure medium line 15. FIG. 2 shows first line segment 11 which is connected to the slave cylinder 5 and second line segment 12 which is connected to master cylinder 4. Pump 16 includes an inlet 18 and an outlet 19 connected to first line segment 11. The pumping direction of pump 16 is from inlet 18 to outlet 19, indicated by an arrow in FIG. 2.

Valve 17 includes a housing 20 having a bore 21. Inside bore 21 there is an axially movable piston 22, which is movable axially along axis 23. Housing 20 is essentially a one-piece block sealed by a cover 24, for example; alternatively, housing 20 may also be divided axially. A stop 44 in the form of a disk-shaped elevation is provided on the side of piston 22 facing away from spring 25. Spring 25 of piston 22 is supported on a side of housing 20 provided with a stepped bore 26. Stepped bore 26 has a smaller diameter than bore 21; a journal 27 having approximately the same outside diameter as the inside diameter of stepped bore 26 (play fit) may be inserted into stepped bore 26 against the pressure of spring 25. Stepped bore 26 and journal 27 form a rear end pressure cylinder having journal 27 as the piston and stepped bore 26 as the cylinder bore. Multiple inlet lines and radial grooves belonging to the inlet lines are provided in housing 20. A first inlet line 28 develops into a peripheral first inlet ring groove 29. First inlet line 28 and first ring groove 29 are provided on the side of piston 22 facing journal 27. A second inlet line 30 develops into a second inlet ring groove 31. A first outlet line 32 develops into an outlet line ring groove 33. A third inlet line 34 is connected to stepped bore 26. First outlet line 32 and third inlet line 34 are joined by a connecting line 35. First outlet line 32 is also directly connected to first line segment 11 at the intersection of first line segment 11 with connecting line 35. Thus there is always a connection between first outlet line 32 and first line segment 11. A third outlet line 36 is situated between first outlet line 32 and third inlet line 34. Third outlet line 36 is connected by a throttle valve 37 and a hydraulic line 38 to the inlet 18 of pump 16. A fourth inlet line 41 which is provided between third outlet line 36 and third inlet line 34 is connected to ring piston space 42 remaining between journal 27 and bore 21 and is also connected to inlet 18 of pump 16 via another hydraulic line 43.

A first piston ring groove 39 and a second piston ring groove 40 are provided on piston 22. First and second piston ring grooves 39, 40 connect different inlet lines 28, 30, 34, 41 to different outlet lines 32, 36, depending on the axial position of piston 22. To facilitate understanding, first and second inlet lines 28, 30 in FIG. 2 are also labeled as G (referring to the inlet line on the master cylinder end), while first outlet line 32 is also labeled as N (referring to the connection on the slave cylinder end) and the third outlet line is labeled as P (referring to the connection on the pump end).

In the following discussion, the phrase "end facing away from the journal" in referring to FIG. 2 is understood to refer to the side in the axial direction of piston 22 which is further away from journal 27 and thus closer to stop 44. Accordingly, the "side facing the journal" is understood to be the side closer to journal 27 in the axial direction.

In FIG. 2, X1 denotes the distance between groove side 45 of second piston ring groove 40 facing away from the journal and groove side 46 of second inlet line ring groove 31 facing the journal. This is also referred to below as control edge G-N. Similarly, X2 denotes the distance between groove side 47 of first piston ring groove 39 facing away from the journal and groove side 48 of outlet line ring groove 33 facing the journal, hereinafter also referred to as control edge N-P. X3 denotes the distance between groove side 50 of first inlet ring groove 29 facing away from the journal and groove 49 of first piston ring 39 facing the journal, hereinafter also referred to as control edge G-P. $A_1$ denotes the diameter of piston 22, $A_2$ denotes the diameter of journal 27 and/or the inside diameter of stepped bore 26, and X4 denotes the axial path or distance of piston 22.

The piston 22 includes an end face 51, which is always hydraulically connected to second inlet line 30, so the hydraulic pressure on the side of master cylinder 4 is always acting on this surface. A back face 58 which is opposite end face 51 is in the present exemplary embodiment designed to be stepped due to journal 27. The terms "end face" and "back face" are understood here to refer to all conceivable surface forms oriented radially to the longitudinal axis of piston 22.

FIG. 2 shows a neutral position of piston 22 in which piston 22 is pressed by spring 25 against stop 44, and X4 assumes its highest value. For quantities X1, X2 and X3 it holds that: X3<X1<X2 or X3=X1<X2. When X1<X2<X3, piston 22 is in an axial position itself to the hydraulic transmission path; this is not harmful but is not preferred. In other words, if X4 is reduced, then first X3 becomes zero and thus a connection is established between first inlet line 28 via first inlet ring groove 29 and first piston ring groove 39 to third outlet line 36. If X1=X3, then at the same time X1 becomes zero so that the connection between second inlet line 30 via second inlet ring groove 31 and piston ring groove 40 as well as outlet ring groove 33 to first outlet line 32 is interrupted. Thus the second line segment is switched from second inlet line 30 to first inlet line 28. If X3<X1, then both the first and second inlet lines are open over a small axial moving path of piston 22. With a further reduction in X4, X2 becomes zero and the connection between first outlet line 32 and third outlet line 36 is interrupted.

In this way, the inlet lines and outlet lines together with the ring grooves in housing 20 and piston 22 form three valves, a first valve GN, a second valve GP, and a third valve NP. The notation of the valves is derived from the connections that are blockable—first valve GN opens and closes hydraulic connection G-N, second valve GP opens and closes connection G-P, and third valve NP opens and closes connection N-P. If X1 becomes zero, the connection between second inlet line 30 (thus G) and stepped bore 26 is interrupted. As long as this valve GN is open, the hydraulic pressure in second line segment 12 generates a force in the direction of spring 25 which is determined by cross section A2 of journal 27. If first valve GN is closed, this force which is additionally exerted on piston 22 is no longer exerted in the active direction of spring 25. Third valve NP is formed by first piston ring groove 39 and outlet line ring groove 33. This valve NP is closed as soon as X2 becomes zero. This interrupts the connection between inlet 18 and outlet 19 of pump 16. This connection forms a bypass B (N→P) for pump 16 when third valve NP is open. Second valve GP is formed by first piston ring groove 39 and first inlet line ring groove 29. As soon as X3 becomes less than zero, this third valve is opened so that a connection is established between second line segment 12 via first inlet line 28 to third outlet line 36 of pump 16, so connection G to P is opened. Throttle valve 37 ensures a low pressure level in ring piston space 42. Alternatively, ring piston space 42 could be connected, e.g., with an equalizing tank of the hydraulic system, through known blow valves to the piston space of master cylinder 4.

The opening cross sections of the three valves formed by the ring grooves change continuously due to the movement of piston 22 so that depending on the position of piston 22 different effective flow-through areas of the connections between second inlet line 30 and stepped bore 26, between first outlet line 32 and stepped bore 26, and between first inlet line 28 and third outlet line 36 are achieved.

If slave cylinder pressure PN (FIG. 3) is less than a threshold PSCH, then piston 22 is at stop 44. The master cylinder 4 and the slave cylinder 5 are directly connected through first valve GN and slave cylinder pressure PN is equal to master cylinder pressure PG. At the same time, pump 16 operates via the bypass opened by third valve NP in a circulation system including first outlet line 32, second valve GP, third outlet line 36, hydraulic line 38, inlet 18, pump 16, and outlet 19. Connecting line 35 branching off between throttle valve 37 and inlet 18 exerts an additional force in the effective direction of spring 25 on piston 22 via the pressure in ring piston space 42 which is lower than slave cylinder pressure PN. Contrary to the active direction of spring 25, a compressive force is exerted by master cylinder pressure PG on end face 51 (having area $A_1$). The condition described previously remains constant with an increasing slave cylinder pressure up to the moment when $$A_1 P_G = A_2 P_N + F_{spring} \tag{1}$$

where A1 and A2 are the end faces of the piston, $F_{spring}$ is the spring force of spring 25. In this state $P_N$ is equal to $P_G$, so the following holds for pressure threshold $P_{SCH}$:

$$P_{SCH} = \frac{F_{spring}}{A_1 - A_2} \tag{2}$$

If the force of the spring is replaced in equation (1) with the help of equation (2), this yields $$P_G = \frac{A_2}{A_1}(P_N - P_{SCH}) + P_{SCH} \tag{3}$$

These equations are always valid when the piston 22 is not in contact with the stop 44, in which case the effective piston area A1 is reduced by the area of stop 44. At a given pedal path, PN is exactly as large as would be the case without servo support because this pressure is determined by the clutch characteristic. Equation (3) is equivalent to the threshold of the pedal force usually defined as $$F_2 - F_{SCH} = k(F_1 - F_{SCH}) \tag{4}$$

where $F_2$ is the pedal force with servo support, $F_1$ is the pedal force without servo support, $F_{SCH}$ is the threshold of the support and k<1 is a reduction factor. In equation (4), k is equivalent to $A_2/A_1$. This means that the hydraulic system according to the present invention statically ensures the required servo support characteristic.

Instead of electronic regulation of the pump volume flow, in the hydraulic system and valve according to the present invention, a constant or variable (not controlled electronically) pump volume flow is used, divided between the pedal volume flow and the circulation volume flow of the bypass by automatic positioning of piston 22. The automatic division is achieved due to the equilibrium of the piston between different pressure surfaces, namely surfaces $A_1$ and $A_2$, and the spring force exerted by spring 25. Therefore, the linear relationship according to equation (4) between the master cylinder pressure and the slave cylinder pressure is ensured.

Figure 3:
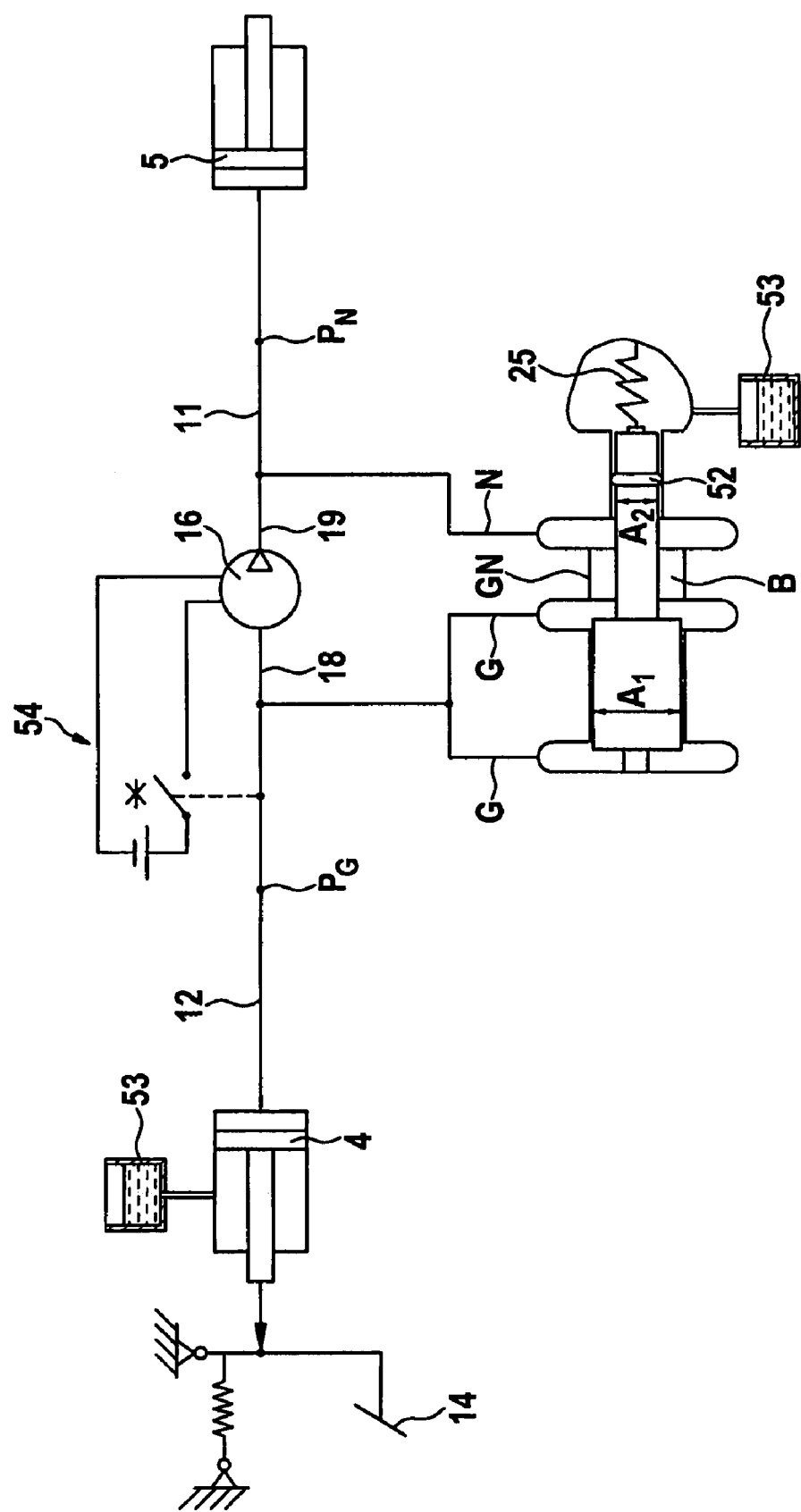
FIG. 3 shows a schematic diagram of the hydraulic system having the valve according to the present invention with the clutch not being operated.
Figure 4:
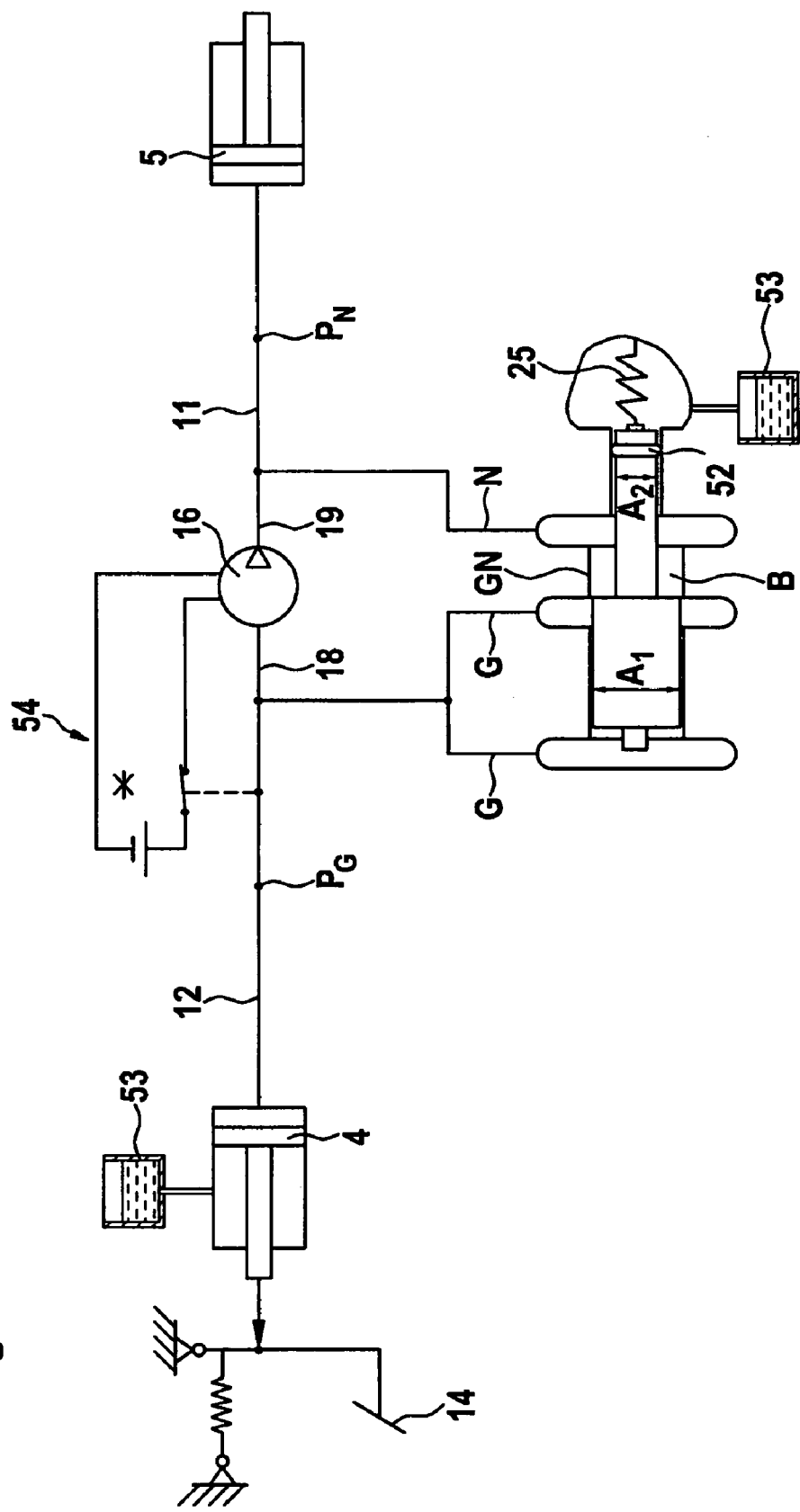
FIG. 4 shows a schematic diagram of the hydraulic system having the valve according to the present invention with the clutch being operated.

FIGS. 3 and 4 illustrate the mechanism of operation of the hydraulic system according to the present invention, using the valve according to the present invention, on the basis of simplified schematic diagrams. Each figure shows master cylinder 4, slave cylinder 5, clutch pedal 14, and equalizing tank 53, first line segment 11, second line segment 12, pump 16, spring 25, a switchable power supply 54 for pump 16, and valve 17. Connections G, N and bypass B as well as surfaces $A_1$ and $A_2$ correspond to those in the exemplary embodiment of FIG. 2. For the sake of simplicity, valve 17 here is depicted as an open system on sides of spring 25, which is indicated by a gasket 52 for sealing the hydraulic system with respect to the surroundings. Leaking hydraulic fluid may enter equalization tank 53, for example. Here again, $P_G$ and $P_N$ denote the pressure on the master cylinder end and the slave cylinder end, respectively.

FIG. 3 shows the hydraulic system with the clutch not operated. The pump is short circuited via valve GN and bypass B and may thus be shut down by a switchable power supply 54, for example, or may continue to operate continuously. The hydraulic fluid flows, i.e., the pressure, is transmitted past pump 16 through connection G, bypass B to connection N.

FIG. 4 shows the hydraulic system with the clutch operated. Due to the build-up of pressure in the system, the piston 22 is moved out of the resting position and valve GN is closed. Therefore, bypass B is closed and hydraulic fluid is transmitted only through pump 16 from master cylinder 4 to slave cylinder 5. In the intermediate positions of the piston between the diagrams in FIG. 3 and in FIG. 4, bypass B is always progressively closed so that the build-up of pressure due to pump 16 always has a progressively greater effect.

Figure 5:
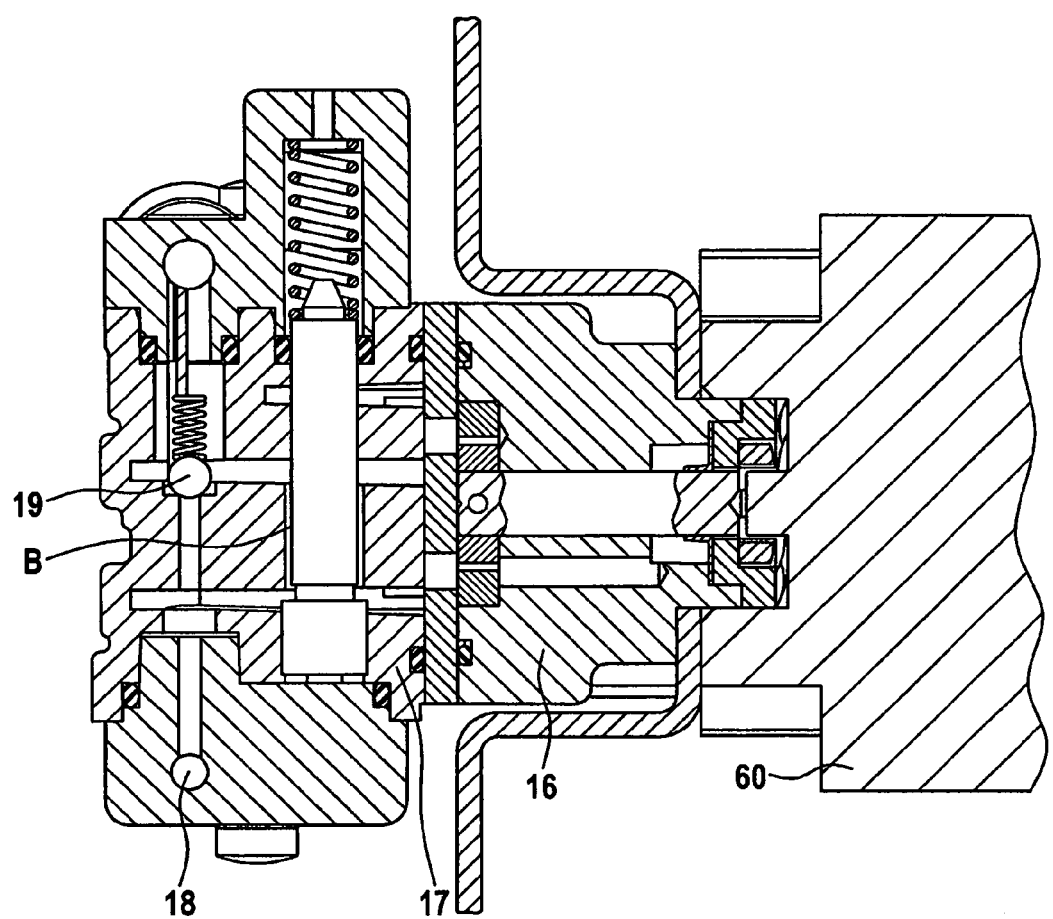
FIG. 5 shows an exemplary embodiment of a pump having a valve control according to the present invention.

FIG. 5 shows an exemplary embodiment of a pump having valve control. This figure contains the two diagrams from FIGS. 3 and 4.

When the clutch is not operated, the pressure is transmitted from the master cylinder to the slave cylinder through bypass B. When the clutch is operated, bypass B is closed and the hydraulic fluid is transferred from master cylinder 4 to slave cylinder 5 via pump 16.

LIST OF REFERENCE NUMERALS 1 hydraulic system
2 valve block
3 clutch release device
4 master cylinder
5 slave cylinder
6 clutch release mechanism
7 clutch
8 internal combustion engine
9 crankshaft
10 transmission input shaft
11 first line segment
12 second line segment
13 mechanical transmission
14 clutch pedal
15 pressure medium line
16 pump
17 valve
18 inlet
19 outlet
20 housing
21 bore
22 piston
23 axis
24 cover
25 spring
26 stepped bore
27 journal
28 first inlet line
29 first inlet line ring groove
30 second inlet line
31 second inlet line ring groove
32 first outlet line
33 outlet line ring groove
34 third inlet line
35 connecting line
36 third outlet line
37 throttle valve
38 hydraulic line
39 first piston ring groove
40 second piston ring groove
41 fourth inlet line
42 ring piston space
43 additional hydraulic line
44 stop
45 groove side of second piston ring groove 40 facing away from journal
46 groove side of second inlet line ring groove 31 facing journal
47 groove side of first piston ring groove 39 facing away from journal
48 groove side of outlet line ring groove 33 facing journal
49 groove side of first piston ring groove 39 facing journal
50 groove side of first inlet ring groove 29 facing away from journal
51 end face
52 sealing element
53 equalizing tank
54 switchable power supply for pump 16
55 housing
56 piston
57 pressure space
58 back side
59 pressure cylinder on back side
60 engine
GN first valve position
GP second valve position
NP third valve position
B bypass

What is claimed is:

1. A hydraulic system comprising:
a master cylinder;
a slave cylinder;
a pressure medium line connecting the master cylinder to the slave cylinder;
a motor driven pump situated in the pressure medium line and having an inlet and an outlet; and
a valve situated in the pressure medium line, the valve having a first valve position where the master cylinder and the slave cylinder are connected directly to one another and a second valve position where the master cylinder and the slave cylinder are connected to one another via the pump,
wherein the valve includes at least one first connection on a master cylinder end and a second connection on a slave cylinder end, a piston axially movable in a housing, the piston having an end face in an operative hydraulic connection with the first connection on the master cylinder end and has a back face opposite the end face, and a spring situated on the back face exerting a force in the direction of the end face on the piston, both the piston and the housing having connecting channels forming valve connections which open and close with axial movement of the piston, wherein the connecting channels are ring grooves on an outside surface of the piston and an inside surface of the housing.

2. A hydraulic system comprising:
a master cylinder;
a slave cylinder;
a pressure medium line connecting the master cylinder to the slave cylinder;
a motor driven pump situated in the pressure medium line and having an inlet and an outlet; and
a valve situated in the pressure medium line, the valve having a first valve position where the master cylinder and the slave cylinder are connected directly to one another and a second valve position where the master cylinder and the slave cylinder are connected to one another via the pump,
wherein the valve includes at least one first connection on a master cylinder end and a second connection on a slave cylinder end, a piston axially movable in a housing, the piston having an end face in an operative hydraulic connection with the first connection on the master cylinder end and has a back face opposite the end face, and a spring situated on the back face exerting a force in the direction of the end face on the piston, both the piston and the housing having connecting channels forming valve connections which open and close with axial movement of the piston,
wherein a first valve connection is formed by an inlet ring groove of the housing and a piston ring groove of the piston.

3. The hydraulic system as recited in claim 2 wherein a second valve connection is formed by an outlet ring groove of the housing and a further piston ring groove of the piston.

4. The hydraulic system as recited in claim 3 wherein a third valve connection is formed by the inlet ring groove of the housing and the further piston ring groove of the piston.

5. A hydraulic system comprising:
a master cylinder;
a slave cylinder;
a pressure medium line connecting the master cylinder to the slave cylinder;
a motor driven pump situated in the pressure medium line and having an inlet and an outlet; and
a valve situated in the pressure medium line, the valve having a first valve position where the master cylinder and the slave cylinder are connected directly to one another and a second valve position where the master cylinder and the slave cylinder are connected to one another via the pump,
wherein the valve includes at least one first connection on a master cylinder end and a second connection on a slave cylinder end, a piston axially movable in a housing, the piston having an end face in an operative hydraulic connection with the first connection on the master cylinder end and has a back face opposite the end face, and a spring situated on the back face exerting a force in the direction of the end face on the piston, both the piston and the housing having connecting channels forming valve connections which open and close with axial movement of the piston,
wherein the valve connections include a first, second and third valve connection, and in an initial position of the piston, the first valve connection is open, the second valve connection is closed, and the third valve connection is open.

6. The hydraulic system as recited in claim 5 wherein as the piston moves axially from the initial position, the first valve connection closes first, the second valve connection then opens when the piston moves further and when the piston moves still further, the third valve connection closes.

7. The hydraulic system as recited in claim 5 wherein during an axial movement of the piston, the first valve connection closes, the second valve connection opens and the third valve connection is open.

8. The hydraulic system as recited in claim 5 wherein during an axial movement of the piston in which the third valve connection closes, the second valve connection is open and the first valve connection is closed.

9. A hydraulic system comprising:
a master cylinder;
a slave cylinder;
a pressure medium line connecting the master cylinder to the slave cylinder;
a motor driven pump situated in the pressure medium line and having an inlet and an outlet;
a valve situated in the pressure medium line, the valve having a first valve position where the master cylinder and the slave cylinder are connected directly to one another and a second valve position where the master cylinder and the slave cylinder are connected to one another via the pump,
wherein the valve includes at least one first connection on a master cylinder end and a second connection on a slave cylinder end, a piston axially movable in a housing, the piston having an end face in an operative hydraulic connection with the first connection on the master cylinder end and has a back face opposite the end face, and a spring situated on the back face exerting a force in the direction of the end face on the piston, both the piston and the housing having connecting channels forming valve connections which open and close with axial movement of the piston; and
a throttle valve situated upstream from the inlet of the pump.

10. The hydraulic system as recited in claim 9 wherein the inlet of the pump is hydraulically connected to a ring piston space formed by a journal at an end of the piston, the piston ring space being on an outside circumference of the piston.

11. A hydraulic system comprising:
a master cylinder;
a slave cylinder;
a pressure medium line connecting the master cylinder to the slave cylinder;
a motor driven pump situated in the pressure medium line and having an inlet and an outlet; and
a valve situated in the pressure medium line, the valve having a first valve position where the master cylinder and the slave cylinder are connected directly to one another and a second valve position where the master cylinder and the slave cylinder are connected to one another via the pump,
wherein the valve includes at least one first connection on a master cylinder end and a second connection on a slave cylinder end, a piston axially movable in a housing, the piston having an end face in an operative hydraulic connection with the first connection on the master cylinder end and has a back face opposite the end face, and a spring situated on the back face exerting a force in the direction of the end face on the piston, both the piston and the housing having connecting channels forming valve connections which open and close with axial movement of the piston,
wherein the piston includes a journal surrounded by the spring.

12. A hydraulic system comprising:

a master cylinder;

a slave cylinder;

a pressure medium line connecting the master cylinder to the slave cylinder;

a pump situated in the pressure medium line and having an inlet and an outlet; and a valve situated in the pressure medium line, the valve having a first valve position where the master cylinder and the slave cylinder are connected directly to one another and a second valve position where the master cylinder and the slave cylinder are connected to one another via the pump;

wherein the valve has a third valve position where the master cylinder and the slave cylinder are connected to one another via the pump, and the outlet and inlet of the pump are connected to one another via a bypass.

13. The hydraulic system as recited in claim 12 wherein the pump is motor driven.

14. The hydraulic system as recited in claim 13 wherein the motor driven pump is an electric motor driven pump.

15. The hydraulic system as recited in claim 12 wherein volume flow through the bypass is regulable by the valve.

16. A hydraulic system comprising:

a master cylinder;

a slave cylinder;

a pressure medium line connecting the master cylinder to the slave cylinder;

a motor driven pump situated in the pressure medium line and having an inlet and an outlet; and a valve situated in the pressure medium line, the valve having a first valve position where the master cylinder and the slave cylinder are connected directly to one another and a second valve position where the master cylinder and the slave cylinder are connected to one another via the pump, wherein the motor driven pump is an electric motor driven pump.

* * * * *